(12) United States Patent
Korfel

(10) Patent No.: US 12,460,440 B1
(45) Date of Patent: Nov. 4, 2025

(54) HYBRID FENCE ASSEMBLY WITH INTEGRATED POLYMER MESH STRUCTURE AND CONDUCTING FENCE WIRE

(71) Applicant: Deerfencing.com LLC, Chester, SC (US)

(72) Inventor: Douglas Korfel, Chester, SC (US)

(73) Assignee: Deerfencing.com LLC, Chester, SC (US)

( * ) Notice: Subject to any disclaimer, the term of this patent is extended or adjusted under 35 U.S.C. 154(b) by 463 days.

(21) Appl. No.: 17/724,145

(22) Filed: Apr. 19, 2022

(51) Int. Cl.
*E04H 17/00* (2006.01)
*A01K 3/00* (2006.01)
*E04H 17/10* (2006.01)

(52) U.S. Cl.
CPC ........... *E04H 17/017* (2021.01); *A01K 3/005* (2013.01); *E04H 17/124* (2021.01)

(58) Field of Classification Search
CPC ......... E04H 17/02; E04H 17/04; E04H 17/05; E04H 17/069; E04H 17/063; E04H 17/10; E04H 17/12; E04H 17/124; E04H 17/161; E04H 17/17; E04H 17/24; E04H 17/261; A01K 3/00; A01K 3/005
See application file for complete search history.

(56) References Cited

U.S. PATENT DOCUMENTS

| | | | | |
|---|---|---|---|---|
| 2,172,050 A * | 9/1939 | Mayberry | ................. | H05C 1/04 256/10 |
| 2,512,740 A * | 6/1950 | Evans | ..................... | A01K 3/004 49/34 |
| 4,553,740 A * | 11/1985 | Bailey | ..................... | E04H 17/161 256/33 |
| 6,289,639 B1 * | 9/2001 | Robertson | ............. | A01K 15/006 47/84 |
| 6,712,339 B1 * | 3/2004 | Smith | ..................... | A01K 3/005 256/10 |
| 9,009,977 B2 * | 4/2015 | Kahtani | .................... | E01F 7/02 29/897.3 |
| 10,070,508 B2 * | 9/2018 | Ricks | ....................... | E04H 17/05 |
| 10,428,554 B2 * | 10/2019 | Johns | ..................... | E04H 17/124 |
| 10,934,741 B2 * | 3/2021 | Malins | .................. | E04H 17/124 |
| 11,020,843 B2 * | 6/2021 | Young | ................... | E04H 17/017 |

(Continued)

FOREIGN PATENT DOCUMENTS

AT           15132 U1 * 11/2016
CH      616480 A5 * 3/1980

(Continued)

OTHER PUBLICATIONS

Lenny Farlee, Brian Beheler, James McKenna, "How to Build a Plastic Mesh Deer Exclusion Fence", Purdue University, Mar. 6, 2014, Last Reviewed Sep. 1, 2015, 9 pgs. https://www.extension.purdue.edu/extmedia/fnr/fnr-486-w.pdf.

*Primary Examiner* — Jonathan P Masinick
(74) *Attorney, Agent, or Firm* — Schwartz Law Firm, P.C.

(57) ABSTRACT

A hybrid fence assembly includes a flexible polymer mesh structure with at least one integrated horizontal conducting wire. The polymer mesh structure has opposite ends, a horizontal length between the ends, and a vertical height. The conducting wire extends between the opposite ends of the mesh structure along its horizontal length, and is adapted for being electrically charged by an electric fence energizer.

20 Claims, 6 Drawing Sheets

(56) References Cited

U.S. PATENT DOCUMENTS

| | | | | |
|---|---|---|---|---|
| 11,168,489 | B2 * | 11/2021 | Callahan | E04H 17/1602 |
| 11,913,247 | B1 * | 2/2024 | Hollberg | E04H 17/02 |
| 2011/0005293 | A1 * | 1/2011 | Lee | B21F 27/005 |
| | | | | 72/371 |
| 2013/0048933 | A1 * | 2/2013 | Trush | E04H 17/1413 |
| | | | | 256/19 |
| 2014/0326938 | A1 * | 11/2014 | Poschelk | E04H 17/124 |
| | | | | 256/19 |
| 2021/0023605 | A1 * | 1/2021 | Ferraiolo | B21F 27/02 |

FOREIGN PATENT DOCUMENTS

| | | | | | |
|---|---|---|---|---|---|
| CH | 652438 | A5 | * | 11/1985 | |
| DE | 2164492 | A1 | * | 11/1972 | |
| DE | 2229040 | A1 | * | 8/1973 | |
| DE | 102006010765 | A1 | * | 9/2007 | A01K 1/0017 |
| DE | 202012007960 | U1 | * | 12/2012 | A01K 3/005 |
| EP | 0503952 | A1 | * | 9/1992 | |
| EP | 3183956 | A1 | * | 6/2017 | A01K 3/005 |
| FR | 2445105 | A1 | * | 7/1980 | |
| GB | 262983 | A | * | 12/1926 | |
| GB | 2187771 | A | * | 9/1987 | A01K 3/005 |
| GB | 2323108 | A | * | 9/1998 | A01K 3/005 |
| KR | 20090007441 | U | * | 7/2009 | |

* cited by examiner

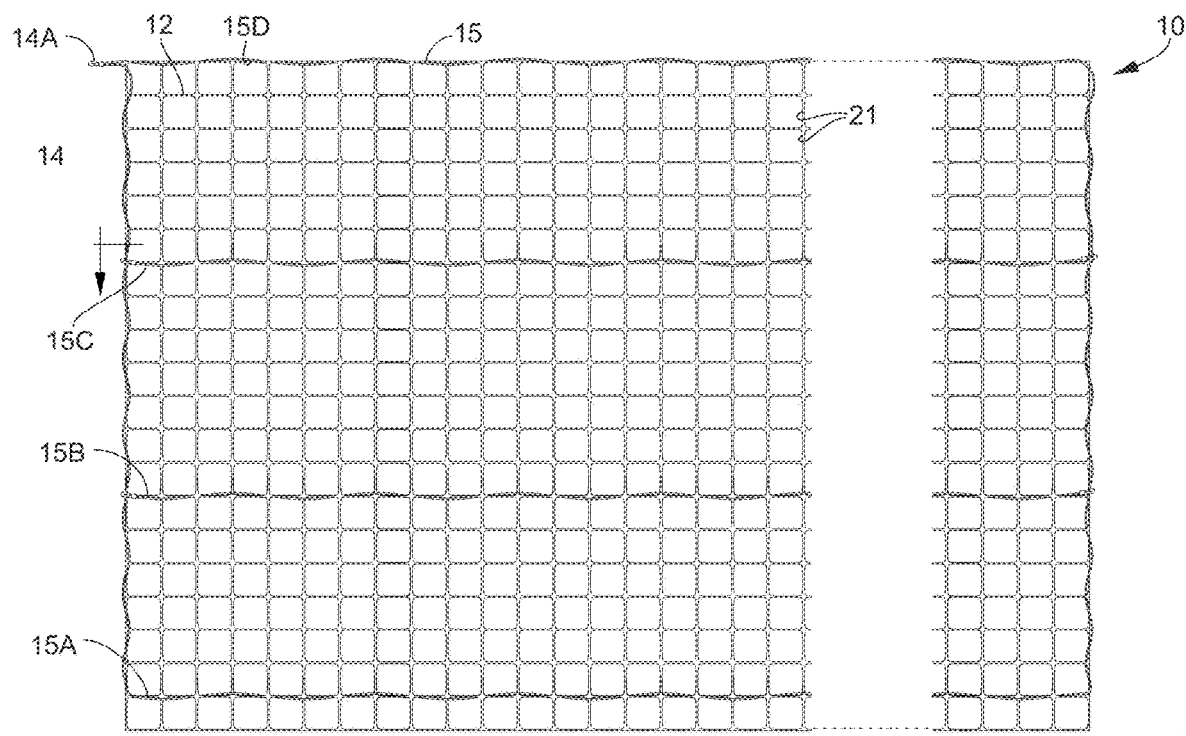

HYBRID FENCE ASSEMBLY WITH INTEGRATED POLYMER MESH STRUCTURE AND CONDUCTING FENCE WIRE

TECHNICAL FIELD AND BACKGROUND OF THE DISCLOSURE

The present disclosure relates broadly and generally to a hybrid fence assembly. In exemplary embodiments, the hybrid fence assembly combines a polymer mesh structure with one or more integrated conducting wires. The conducting wire electrically connects to a fence energizer and carries electric current in a manner similar to traditional electric fences of the prior art.

Standard electric fence systems are used to control a wide variety of animals. A typical electric fence creates a psychological barrier designed to keep certain animals in and other animals out. Upon touching the charged fence and receiving an electric shock, the animal quickly becomes "trained" to avoid the fence and remain either inside or outside of the enclosed area. In some cases, a wild animal may inadvertently run through the electric wires of the prior art fence, damaging the fence and creating a temporary access/escape point for other animals. This problem is especially prevent in standard electric fences with relatively low breaking strength. The hybrid fence assembly of the present disclosure addresses this issue by combining the deterring effect created by electrical shock with the high breaking strength of a polymer mesh structure.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a hybrid fence assembly including a flexible polymer mesh structure with at least one integrated horizontal conducting wire. The polymer mesh structure has opposite ends, a horizontal length between the ends, and a vertical height. The conducting wire extends between the opposite ends of the mesh structure along its horizontal length, and is adapted for being electrically charged by an electric fence energizer. The exemplary fence assembly may be supplied in roll form in lengths of 100 feet or more.

The term "hybrid" means having combined features of a traditional polymer mesh fence and a traditional electric fence.

The term "integrated" as used herein means joined together by interlacing, fasteners, ultrasonic welding, adhesives or bonding agents, or other such means.

The term "conducting wire" means electrically conductive. The exemplary conducting wire may be rated for as much as 20,000 volts.

According to another exemplary embodiment, the horizontal conducting wire is interlaced with the polymer mesh structure such that a first portion of the horizontal conducting wire resides primarily on an inside of the hybrid fence assembly and a second portion of said horizontal conducting wire resides primarily on an outside of the hybrid fence assembly.

According to another exemplary embodiment, the hybrid fence assembly comprises a plurality of horizontal conducting wires vertically spaced apart and extending substantially parallel to one another along the horizontal length of the polymer mesh structure.

According to another exemplary embodiment, adjacent ones of the plurality of horizontal conducting wires are spaced apart a vertical distance of between 20 and 40 inches. Alternatively, the horizontal conducting wires may be spaced between 2 and 40 inches.

According to another exemplary embodiment, the hybrid fence assembly further comprises a vertical conducting wire operatively connecting the plurality of horizontal conducting wires in parallel. The exemplary vertical conducting may have a gauge of between 10AWG and 14AWG. Alternatively, the gauge of the vertical conducting wire may range from 14AWG to 22AWG.

According to another exemplary embodiment, the polymer mesh structure defines a plurality of substantially uniform square mesh openings.

According to another exemplary embodiment, each mesh opening measures between approximately 1 and 2 square inches.

According to another exemplary embodiment, the horizontal conducting wire has a gauge of between 10AWG and 14AWG. Alternatively, the gauge of the horizontal conducting wire may range from 14AWG to 22AWG.

According to another exemplary embodiment, each of the horizontal and vertical conducting wires comprises an insulated steel wire. Alternatively, the conducting wires may comprise any other conductive metal, such as aluminum. In yet another embodiment, the horizontal and vertical conducting wires may comprise an insulated (PE) aluminum/copper braided wire.

According to another exemplary embodiment, the polymer mesh structure has a breaking strength greater than 650 pounds per square foot, and between 650 pounds and 1400 pounds per square foot.

According to another exemplary embodiment, the vertical height of the polymer mesh structure is between 4 and 8 feet.

In another exemplary embodiment, the present disclosure comprises a fence installation kit. The exemplary kit includes a hybrid fence assembly, a plurality of fence posts, and a plurality of non-conductive insulator clips adapted for attachment to the fence posts. As previously described, the hybrid fence assembly includes a flexible polymer mesh structure having opposite ends, a horizontal length between the ends, and a vertical height. At least one horizontal conducting wire is integrated with the polymer mesh structure and extends between the opposite ends along the horizontal length. The horizontal conducting wire is adapted for being electrically charged by a standard electric fence energizer.

According to another exemplary embodiment, the insulator clip has a C-shaped post mount designed to frictionally engage the fence post. The exemplary fence posts may comprises either 2⅜ inch round metal posts, or 1⅝ round metal posts, or other standard framework sizes.

According to another exemplary embodiment, the insulator clip further comprises a shield wall integrally formed with the C-shaped post mount.

According to another exemplary embodiment, the insulator clip further comprises an upwardly-turned hook extending outwardly from the shield wall and configured to carried the polymer mesh structure and the horizontal conducting wire, thereby locating the horizontal conducting wire away from the vertical post on an outside of the shield wall such that the conducting wire is electrically isolated relative to the ground.

According to another exemplary embodiment, the insulator clip is constructed of a molded plastic.

In yet another exemplary embodiment, the present disclosure comprises a method for enclosing an area of land. The method includes selecting a hybrid fence assembly comprising a flexible polymer mesh structure with an integrated horizontal conducting wire. The polymer mesh structure has opposite ends, a horizontal length between the opposite ends, and a vertical height. The conducting wire extends between the opposite ends along the horizontal length, and is adapted for being electrically charged by an electric fence energizer. A plurality of spaced-apart fence posts are installed in earth around the area of land to be enclosed. At least one non-conductive insulator clip is attached to each of the fence posts. The hybrid fence assembly is then suspended (hung) from the insulator clip at each of the fence posts, such that the horizontal conducting wire is spaced apart from the vertical post on an outside of the insulator clip, thereby isolating the conducting wire relative to the earth.

BRIEF DESCRIPTION OF THE DRAWINGS

Exemplary embodiments of the present disclosure will hereinafter be described in conjunction with the following drawing figures, wherein like numerals denote like elements, and wherein:

FIG. 1 is a view of a fragmented length of the present hybrid fence assembly according to one exemplary embodiment of the present disclosure;

FIG. 2 is cross-sectional view of the exemplary hybrid fence assembly illustrating the weave pattern of the horizontal conducting wires;

DESCRIPTION OF EXEMPLARY EMBODIMENTS AND BEST MODE

Figure 3:
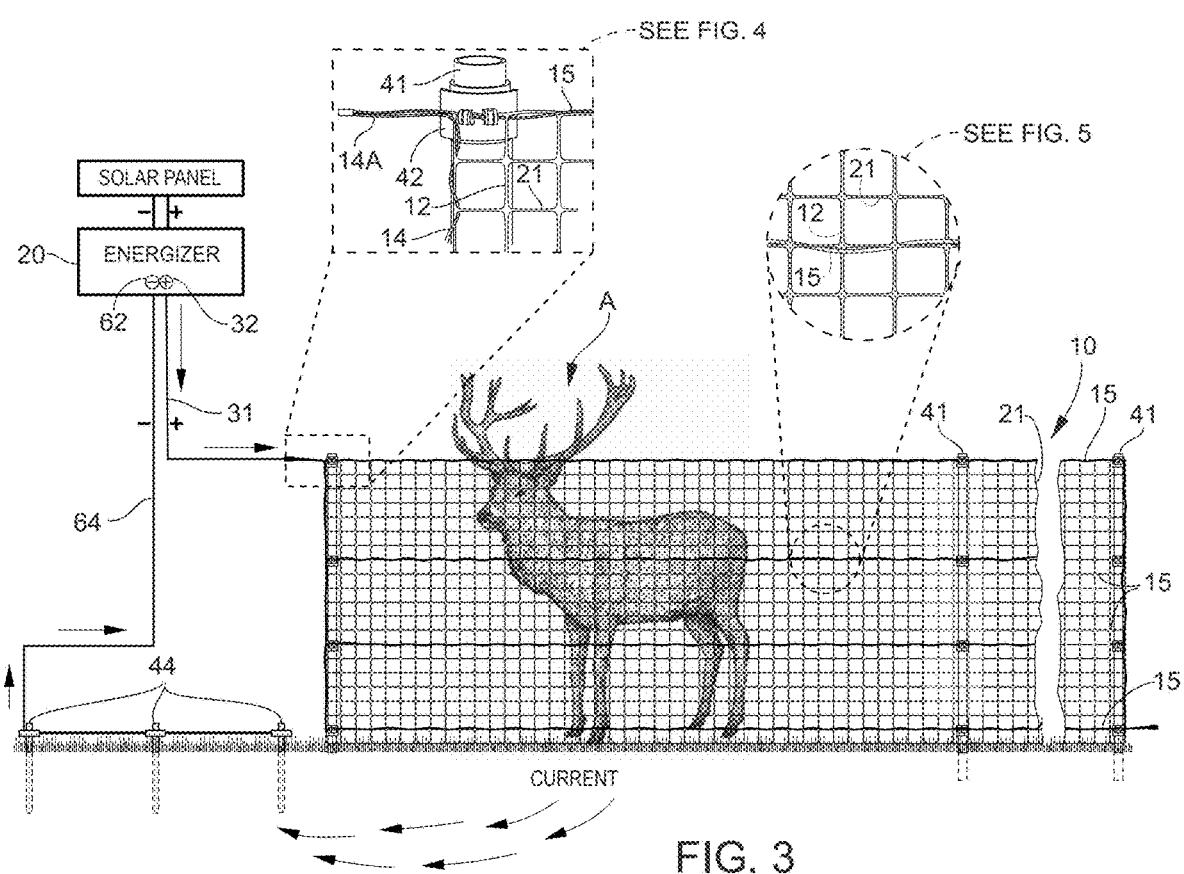
FIG. 3 is an environmental view showing a portion of the hybrid fence assembly installed and connected to a solar-powered fence energizer.

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now specifically to the drawings, a hybrid fence assembly according to one exemplary embodiment of the present disclosure is illustrated in FIG. 1 and shown generally at broad reference numeral 10. The exemplary fence assembly 10 comprises a flexible polymer mesh structure 12 with integrated vertical and horizontal conducting wires 14, 15. The conducting wires 14, 15 carry electric current supplied by a fence energizer 20, shown diagrammatically in FIG. 3, and function to combine the deterring effect created by electrical shock with the relatively high breaking strength of the polymer mesh structure 12. In exemplary embodiments, the breaking strength of the fence assembly 10 may be up to 1400 pounds per square foot or more. The hybrid fence assembly 10 is especially useful in commercial and agricultural grade applications for enclosing farm land, ranches and other large open areas of land. Such tracts often require more than a thousand linear feet of fencing. The polymer mesh structure 12 and integrated conducting wires 14, 15 cooperate to keep out (or fence in) medium to large size animals including deer, wolves, horses, cattle and other livestock, dogs, cats and others. When charged, the integrated conducting wires 14, 15 carry an electric current of between 2000 and 8000 volts; and in some applications, may carry as much as 20000 volts. The exemplary hybrid fence assembly 10 is lightweight and easy to work, and may be supplied in roll form in lengths of 100 feet or more for convenient transport and installation.

The flexible polymer mesh structure 12 of the exemplary fence assembly 10 is fabricated of 100% virgin polypropylene and defines substantially uniform square mesh openings 21. Each mesh opening 21 measures between 1-2 square inches. The polymer mesh structure 12 has opposite ends, a horizontal length between the ends, and a vertical height. In one embodiment, the height of the mesh structure 12 is approximately 7.5 feet. The exemplary mesh structure 12 has a finished top edge and a cut (rough) or semi-finished bottom edge. The exemplary mesh structure 12 will not corrode or rust, and has a breaking strength of greater than 650 pounds per square foot.

Figure 4:
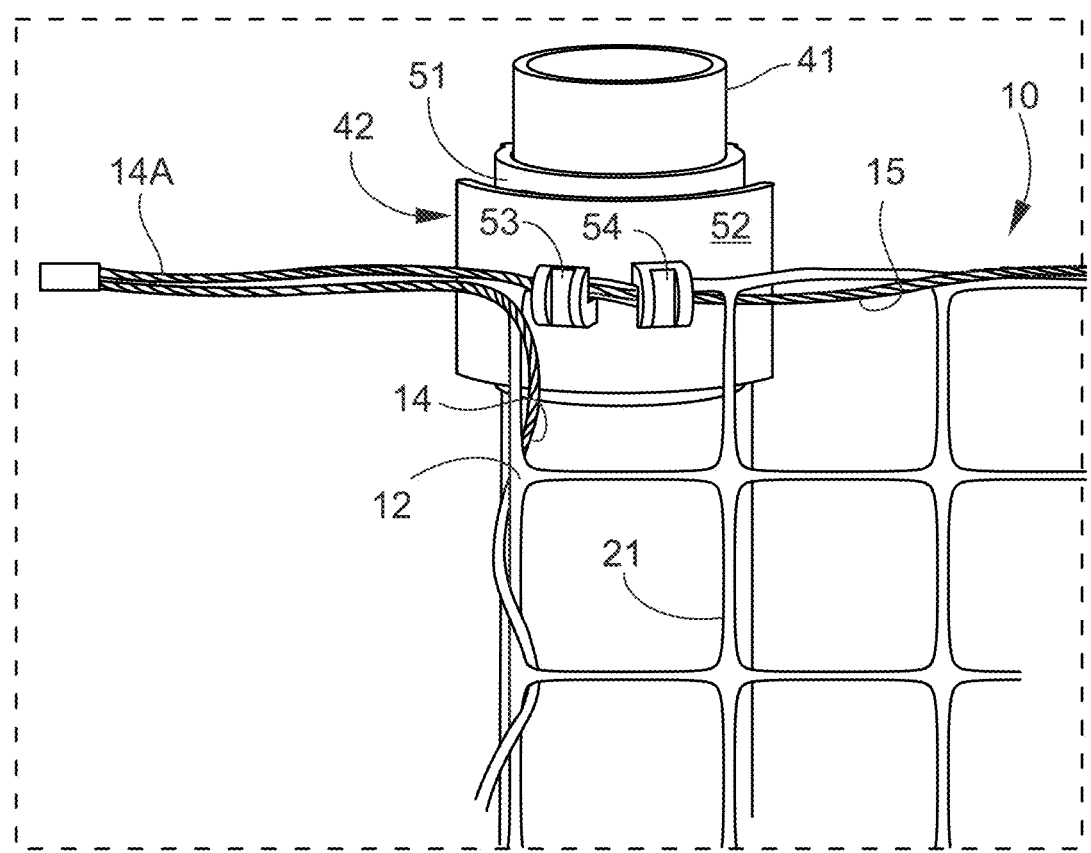
FIG. 4 is an enlarged view of the fence section indicated at reference 4 in FIG. 3.
Figure 5:
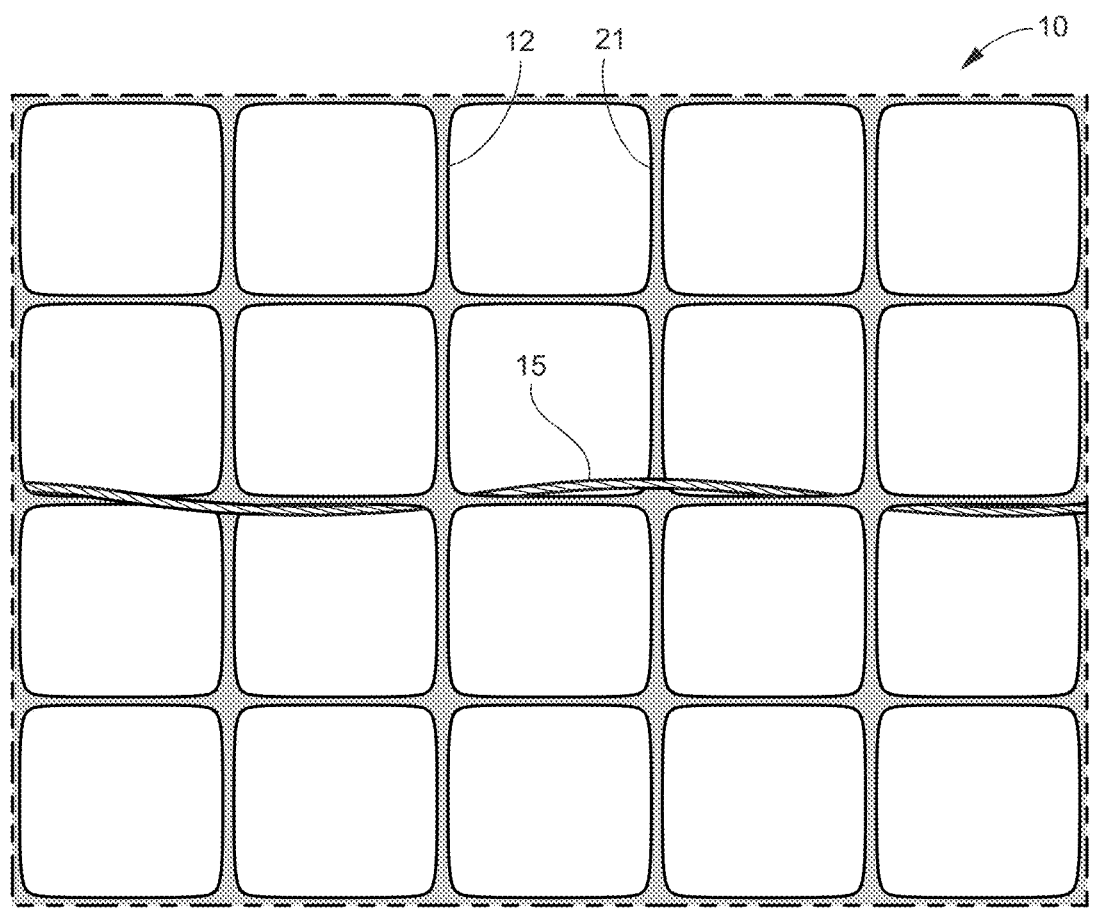
FIG. 5 is an enlarged view of the fence section indicated at reference 5 in FIG. 3.
Figure 6:
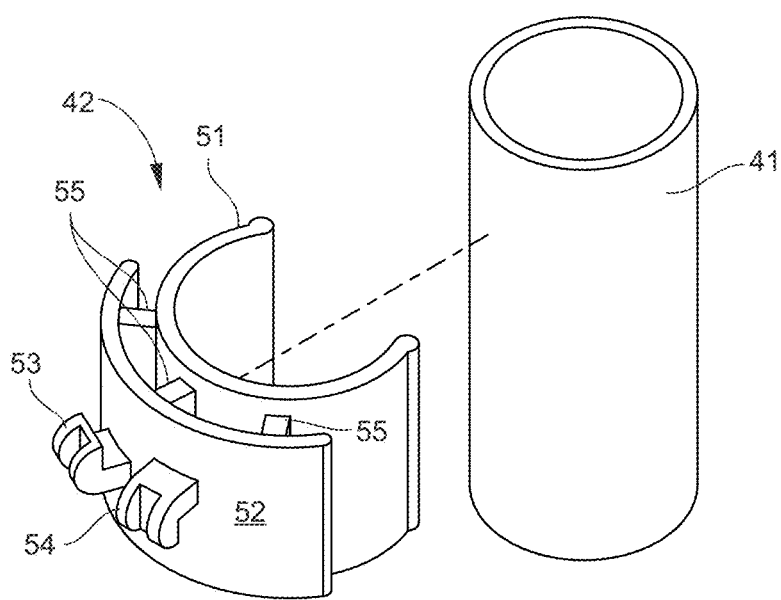
FIG. 6 is a perspective view of an exemplary non-conductive insulator clip designed for friction attachment to the round metal fence post.

In one embodiment, each of the vertical and horizontal conducting wires 14, 15 comprise an insulated steel or aluminum wire having a gauge of between 10AWG and 22AWG, and rated for up to 20,000 volts. The vertical conducting wire 14 (or "jumper wire") is wrapped around an end edge of the polymer mesh structure 12 passing through openings 21, as best shown in FIGS. 1 and 4, and functions to electrically connect the horizontal conducting wires 15 in a parallel circuit. Multiple jumper wires 14 may be incorporated in single 100-foot roll of fencing. As best shown in FIGS. 1, 2 and 5, each horizontal conducting wire 15 is integrally woven through every other mesh opening 21 in a substantially horizontal path from one end of the mesh structure 12 to an opposite end of the mesh structure 12, such that a first portion of each conducting wire 15 resides primarily on an inside of the hybrid fence assembly 10 while a second portion of each conducting wire 15 resides primarily on an outside of the hybrid fence assembly 10.

In the exemplary embodiment, the hybrid fence assembly 10 comprises 4 horizontal conducting wires 15 interlaced with the polymer mesh structure 12 in a substantially parallel arrangement. The conducting wires 15 are identical and are labeled 15A-15D for illustration purposes in FIG. 1. The bottom horizontal conducting wire 15A is located about 2-6 inches from the bottom edge of the polymer mesh structure 12, the lower intermediate conducting wire 15B is located about 28-29 inches from the bottom wire, the upper intermediate conducting wire 15C is located about 28-29 inches from the lower intermediate wire 15B, and the top conducting wire 15D is located at the finished top edge of mesh structure 12 about 28-29 inches from the upper intermediate wire 15C. Respective ends of the conducting wires 15 may be electrically connected to the jumper wire 14 using conventional hardware, such as wire clamps, clips, or fasteners, or by soldering, crimping or other suitable means. The free end of the jumper wire 14A is designed for electrically connecting to a lead-out wire 31 of the electric fence energizer 20. See FIG. 3. The lead-out wire 31 connects to a positive terminal 32 on the energizer 20. When activated, the energizer 20 charges the hybrid fence assembly 10 passing electric current through the lead-out wire 31, vertical jumper wire 14 and horizontal conducting wires 15. In an alternative embodiment, the top conducting wire 15D may be spaced down (e.g., 2 mesh squares) from the finished top edge of the mesh structure 12 in order to accommodate a horizontal tensioned PVC-coated steel cable used to help suspend and retain the mesh structure 12 in the fence assembly 10.

Referring to FIG. 3, the hybrid fence assembly 10 operates on basic electric principles. An open circuit is created using the conducting wires 14, 15, the fence energizer 20, and the ground. When an animal "A" touches a charged (or "hot") horizontal wire 15 of the fence assembly 10, the electric current will pass through the animal "A" to the earth thereby closing the electrical circuit. The electricity travels a complete path from the fence energizer 20 through the conducting wires 14, 15, then through the animal "A", causing the animal to receive a brief shock, before returning through the ground to the energizer 20.

To complete the exemplary fence installation shown in FIG. 3, an installation crew may be provided a fence kit comprising one or more rolls of the present hybrid fence assembly 10, a number of 2⅜-inch or 1⅝-inch round metal fence posts 41, a number of non-conductive insulator clips 42, and metal grounding rods 44. The exemplary insulator clips 42 of the present disclosure are novel and include unique features and advantages absent in related insulators of the prior art.

Figure 7:
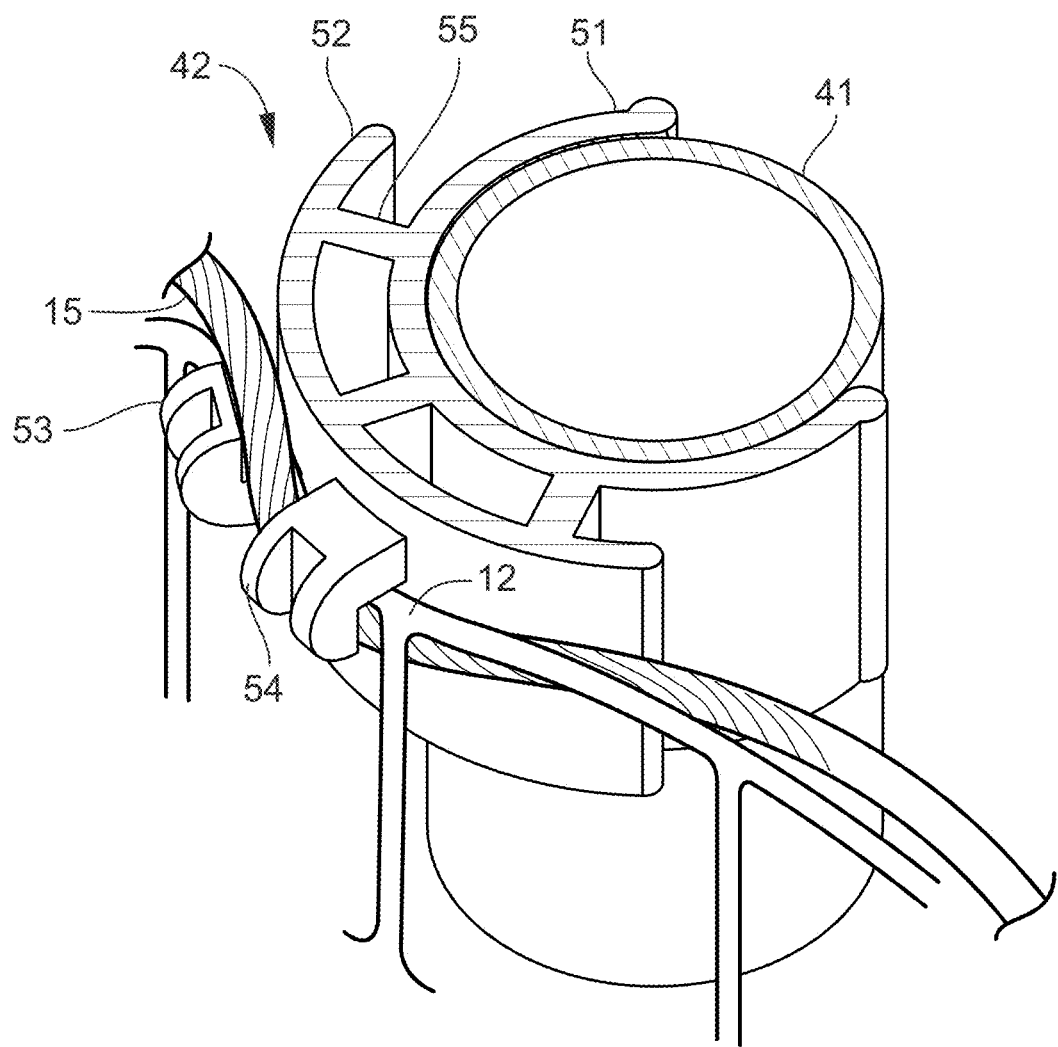
FIG. 7 is a perspective view of the insulator clip attached to the fence post and holding the conducting wire and mesh structure between upwardly-turned and downwardly-turned offset hooks of the exemplary clip.

Referring to FIGS. 3, 4, 6 and 7, each fence post 41 utilizes 4 vertically spaced insulator clips 42—one at each location of the horizontal conducting wires 15. The exemplary insulator clip 42 is integrally molded of plastic and comprises a C-shaped post mount 51, a curved solid shield wall 52, and cooperating upwardly-turned and downwardly-turned offset hooks 53, 54. The C-shaped mount 51 has sufficient flex to receive and frictionally engage the fence post 41 at a selected height on the post. The curved shield wall 52 is spaced apart from the post mount 51 by vertical spacers 55 integrally formed between an inside of the shield wall 52 and post mount 51. The offset hooks 53, 54 are located on an outside of the shield wall 52 and are configured to receive and secure the horizontal conducting wire 15 and polymer mesh structure 12, as best shown in FIG. 7, thereby locating the conducting wire 15 away from the metal fence post 41. The shield wall 52 forms a non-conductive barrier which electrically isolates the conducting wire 15 relative to the ground.

The exemplary fence energizer 20, shown diagrammatically in FIG. 3, functions to convert battery power into a high voltage pulse. The energizer 20 releases this electrical pulse through the lead-out wire 31 of positive terminal 32 to the jumper wire 14 and onto the conducting wires 15 of hybrid fence assembly 10. In the exemplary embodiment, the energizer battery is charged by solar panel 61. One commercial example of a suitable fence energizer 20 is the battery/solar operated low impedance fence energizer sold under the brand name XSTOP™ BX280. The negative terminal 62 of energizer 20 is connected to a ground wire 64 leading to grounding rods 44. In the example shown, the fence assembly 10 utilizes three electrically connected grounding rods 44 driven into the earth and spaced about 10 feet apart from one another.

Exemplary Installation

Before installing the hybrid fence assembly 10, the area of land to be enclosed is cleared and the post locations flagged. Post spacing generally ranges from 8 feet to 15 feet. Post sleeves are driven into the ground at the flagged post locations. Each sleeve receives a 2⅜-inch or 1⅝-inch round metal fence post 41. At a first (or start) post the non-conductive insulator clips 42 are placed at heights corresponding to locations of the horizontal conducting wires 15 of the hybrid fence assembly 10. At the starting end of the fence roll, the hybrid fence assembly 10 is suspended from each of the insulator clips 42 at the upwardly-turned and downwardly-turned hooks 53, 54, as shown in FIG. 7, such that the horizontal conducting wire 15 is spaced apart from the fence post 41 on an outside of the insulator clip 42. The hybrid fence assembly 10 is unrolled, and this process repeats from post to post. The fence assembly 10 may be further secured to the posts 41 using fence ties, and accommodations are made for any gates. The start and end posts 41 of the fence assembly 10 may comprise between 4-8 insulator clips.

ALTERNATIVE EMBODIMENTS

In alternative embodiments not shown, the exemplary fence assembly may utilize only a single conducting wire integrally woven with the polymer mesh structure. The single wire may snake back and forth from one end of the mesh structure to the other, and may electrically connect to a lead-out of the fence energizer in a series circuit. In a further alternative embodiment, the exemplary fence assembly may incorporate a combination of parallel and series wiring integrally woven into the mesh structure. In yet another embodiment, the hybrid fence assembly incorporates a two-wire system with alternating charged ("hot") and ground wires interlaced into the mesh structure. The wire from the ground terminal of the fence energizer connects directly to the ground rods, and then connects to the ground wires on the fence assembly. The charged wires are connected to the lead-out of the positive terminal on the energizer. In this embodiment, the animal completes the circuit by touching a charged wire and a ground wire at the same time.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A hybrid fence assembly comprising:
   a flexible polymer mesh structure having opposite ends, a horizontal length between said ends, and a vertical height; and
   at least one electrically-chargeable horizontal conducting wire integrated with said polymer mesh structure and extending between said opposite ends along said horizontal length; and
   an electric fence energizer operatively connected to said at least one electrically-chargeable horizontal conducting wire to electrically charge said at least one electrically-chargeable horizontal conducting wire, such that when an animal touches said at least one electrically-chargeable horizontal conducting wire when charged by the electric fence energizer, an electric current passes from an exterior of said at least one electrically-chargeable horizontal conducting wire through the animal causing the animal to receive an electric shock.

2. The hybrid fence assembly according to claim 1, wherein said at least one horizontal conducting wire is interlaced with said polymer mesh structure such that a first portion of said horizontal conducting wire resides primarily on an inside of said hybrid fence assembly and a second portion of said horizontal conducting wire resides primarily on an outside of said hybrid fence assembly.

3. The hybrid fence assembly according to claim 1, wherein said at least one horizontal conducting wire comprises a plurality of horizontal conducting wires vertically spaced apart and extending substantially parallel to one another along the horizontal length of said polymer mesh structure.

4. The hybrid fence assembly according to claim 3, wherein adjacent ones of said plurality of horizontal conducting wires are spaced apart a vertical distance of between 20 and 40 inches.

5. The hybrid fence assembly according to claim 3, and comprising a vertical conducting wire operatively connecting said plurality of horizontal conducting wires in parallel.

6. The hybrid fence assembly according to claim 1, wherein said polymer mesh structure defines a plurality of substantially uniform square mesh openings.

7. The hybrid fence assembly according to claim 6, wherein each mesh opening measures between approximately 1 and 2 square inches.

8. The hybrid fence assembly according to claim 1, wherein said at least one horizontal conducting wire has a gauge of between 10AWG and 22AWG.

9. The hybrid fence assembly according to claim 1, wherein said at least one horizontal conducting wire comprises an insulated steel wire.

10. The hybrid fence assembly according to claim 1, wherein said polymer mesh structure has a breaking strength greater than 650 pounds.

11. The hybrid fence assembly according to claim 1, wherein the vertical height of said polymer mesh structure is between 4 and 8 feet.

12. A fence installation kit, comprising:
a hybrid fence assembly comprising:
(i) a flexible polymer mesh structure having opposite ends, a horizontal length between said ends, and a vertical height; and
(ii) at least one electrically-chargeable horizontal conducting wire integrated with said polymer mesh structure and extending between said opposite ends along said horizontal length;
an electric fence energizer operatively connected to said at least one electrically-chargeable horizontal conducting wire to electrically charge said at least one electrically-chargeable horizontal conducting wire, such that when an animal touches said at least one electrically-chargeable horizontal conducting wire when charged by the electric fence energizer, an electric current passes from an exterior of said at least one electrically-chargeable horizontal conducting wire through the animal causing the animal to receive an electric shock;
a plurality of fence posts; and
a plurality of non-conductive insulator clips adapted for attachment to said fence posts.

13. The fence installation kit according to claim 12, wherein said insulator clip comprises a C-shaped post mount designed to frictionally engage said fence post.

14. The fence installation kit according to claim 13, wherein said insulator clip further comprises a shield wall integrally formed with said C-shaped post mount.

15. The fence installation kit according to claim 14, wherein said insulator clip further comprises an upwardly-turned hook extending outwardly from said shield wall and configured to carried said polymer mesh structure and said horizontal conducting wire thereby locating said horizontal conducting wire away from said vertical post on an outside of said shield wall.

16. The fence installation kit according to claim 12, wherein said insulator clip is constructed of a molded plastic.

17. The fence installation kit according to claim 12, wherein said at least one horizontal conducting wire is interlaced with said polymer mesh structure such that a first portion of said horizontal conducting wire resides primarily on an inside of said hybrid fence assembly and a second portion of said horizontal conducting wire resides primarily on an outside of said hybrid fence assembly.

18. The fence installation kit according to claim 12, wherein said at least one horizontal conducting wire comprises a plurality of horizontal conducting wires vertically spaced apart and extending substantially parallel to one another along the horizontal length of said polymer mesh structure.

19. The fence installation kit according to claim 18, and comprising a vertical conducting wire operatively connecting said plurality of horizontal conducting wires in parallel.

20. A method for enclosing an area of land, said method comprising:
selecting a hybrid fence assembly comprising a flexible polymer mesh structure having opposite ends, a horizontal length between the opposite ends, and a vertical height, and at least one electrically-chargeable horizontal conducting wire interlaced with the polymer mesh structure and extending between the opposite ends along the horizontal length;
electrically charging said at least one electrically-chargeable horizontal conducting wire using an electric fence energizer, such that when an animal touches said at least one electrically-chargeable horizontal conducting wire, an electric current passes from an exterior of said at least one electrically-chargeable horizontal conducting wire through the animal causing the animal to receive an electric shock;
installing a plurality of spaced-apart fence posts in earth around the area of land to be enclosed;
attaching at least one non-conductive insulator clip to each of the fence posts; and
suspending the hybrid fence assembly from the insulator clip at each of the fence posts, such that the horizontal conducting wire is spaced apart from the vertical post on an outside of the insulator clip, thereby isolating the conducting wire relative to the earth.

\* \* \* \* \*